US008195027B2

(12) United States Patent
Tominaga

(10) Patent No.: US 8,195,027 B2
(45) Date of Patent: Jun. 5, 2012

(54) SIGNAL PROCESSING METHOD, SIGNAL PROCESSING APPARATUS, SIGNAL PROCESSING SYSTEM, AND MACHINE READABLE STORAGE MEDIUM STORING CONTROL INFORMATION OF SIGNAL PROCESSING APPARATUS

(75) Inventor: Hiroyuki Tominaga, Kanagawa (JP)

(73) Assignee: Sony Corporation (JP)

( * ) Notice: Subject to any disclaimer, the term of this patent is extended or adjusted under 35 U.S.C. 154(b) by 1344 days.

(21) Appl. No.: 11/888,260

(22) Filed: Jul. 31, 2007

(65) Prior Publication Data

US 2007/0274674 A1 Nov. 29, 2007

Related U.S. Application Data

(63) Continuation of application No. 10/203,535, filed as application No. PCT/JP01/11538 on Dec. 27, 2001, now Pat. No. 7,725,005.

(30) Foreign Application Priority Data

Dec. 27, 2000 (JP) ................................. 2000-398487

(51) Int. Cl.
*H04N 9/80* (2006.01)
*H04N 5/93* (2006.01)

(52) U.S. Cl. ......................... 386/239; 386/248; 386/353

(58) Field of Classification Search .................. 386/239, 386/248, 353

See application file for complete search history.

(56) References Cited

U.S. PATENT DOCUMENTS 5,784,646 A 7/1998 Sawada et al.
5,896,388 A 4/1999 Earnest
5,951,639 A 9/1999 MacInnis
5,991,690 A * 11/1999 Murphy ........................ 701/211
6,046,750 A 4/2000 Fitzpatrick et al.
6,642,939 B1 11/2003 Vallone et al.
6,665,004 B1 12/2003 Paff
6,832,293 B1 12/2004 Tagawa et al.

(Continued)

FOREIGN PATENT DOCUMENTS

EP 0 560 987 A1 9/1993

(Continued)

OTHER PUBLICATIONS

Office Action from Japanese 2009-252065, dated Jul. 5, 2011.

(Continued)

*Primary Examiner* — Thai Tran
*Assistant Examiner* — Hung Dang
(74) *Attorney, Agent, or Firm* — Lerner, David, Littenberg, Krumholz & Mentlik, LLP

(57) ABSTRACT

A signal processing apparatus capable of easily linking video data of a DVCR connected by an i-Link or the like and utilizing the same in a desired format is disclosed. Streaming data such as video data is defined, managed, and controlled in usage by an "optional-media" link tag linked to a "gpoi" tag defining a specific position in a position information file. The "optional-media" link can describe the five attributes of a format attribute for designating a connected apparatus and format information thereof, id attribute for further specifying the target in the connected apparatus designated by the format attribute, an "in" attribute and "out" attribute for designating a reproduction start position and ending position of the designated data, and a repeat attribute for designating a number of times of reproduction.

12 Claims, 7 Drawing Sheets

U.S. PATENT DOCUMENTS

| | | | | |
|---|---|---|---|---|
| 2001/0055467 | A1 * | 12/2001 | Nakatani et al. | 386/46 |
| 2004/0033059 | A1 * | 2/2004 | Kim et al. | 386/113 |

FOREIGN PATENT DOCUMENTS

| | | | |
|---|---|---|---|
| EP | 0 886 276 | A2 | 12/1998 |
| JP | 06341846 | A | 12/1994 |
| JP | 8-166926 | A | 6/1996 |
| JP | 8-219798 | A1 | 8/1996 |
| JP | 08219798 | A | 8/1996 |
| JP | 09-8753 | A1 | 1/1997 |
| JP | 9-120666 | A | 5/1997 |
| JP | 9-196694 | A1 | 7/1997 |
| JP | 09305751 | A | 11/1997 |
| JP | 10-089978 | A | 4/1998 |
| JP | 10-89978 | A1 | 4/1998 |
| JP | 10-112633 | A1 | 4/1998 |
| JP | 10256927 | A | 9/1998 |
| JP | 11-094571 | A | 4/1999 |
| JP | 11-94571 | A1 | 4/1999 |
| JP | 11-203843 | A | 7/1999 |
| JP | 11337353 | A | 12/1999 |
| JP | 2000-040973 | A | 2/2000 |
| JP | 2000-40973 | A1 | 2/2000 |
| JP | 2000050123 | A | 2/2000 |
| JP | 2001-050756 | A | 2/2001 |
| WO | WO-91/18345 | A1 | 11/1991 |
| WO | 9905615 | A1 | 2/1999 |

OTHER PUBLICATIONS

Office Action from Japanese Application No. 2009-252065, dated Sep. 6, 2011.

* cited by examiner

FIG.3

```
<?xml version="1. 0" encoding="Shift_JIS"?>
<!DOCTYPE glorie PUBLIC "-//GLORIE//GLORIE V1.0//EN" "glorie.dtd">
<glorie version="1.0">

  <format>
     <datum>wgs84</datum>
     <time>1999-09-01T10:20:30+09:00</time>
  </format>

  <gpoi>
     <index pos="+35.66778 +139.7686 14000000 fix tokyo"/>
     <poi>
         <point>
            <pos>
                <lat>35.667778</lat>
                <lon>139.7686</lon>
            </pos>
         </point>
     </poi>

     <linkfile>
         <optional-media format="DVSDNT" id="TRAVEL FOR KYUSHU No.2"in="00:01:30:00">
            <comment>TOP OF MT.ASO</comment>
         </optional-media>
     </linkfile>

   </gpoi>

</glorie>
```

FIG.6

```
<?xml version="1.0" encoding="Shift_JIS"?>
<!DOCTYPE glorie PUBLIC "-//GLORIE//GLORIE V1.0//EN" "glorie.dtd">
<glorie version="1.0">

  <format>
    <datum>wgs84</datum>
    <time>1999-09-01T10:20:30+09:00</time>
  </format>

  <gpoi>
    <index pos="+35.66778 +139.7686 14000000 fix tokyo"/>
    <poi>
        <point>
          <pos>
            <lat>35.667778</lat>
            <lon>139.7686</lon>
          </pos>
        </point>
    </poi>

    <linkfile>
      <optional-media format="DVSDNT" id="TRAVEL FOR KYUSHU No.2"in="00:01:30:00">
        <comment>TOP OF MT.ASO</comment>
        <activate-condition>
          <activate-radius>
            <outmost>500</outmost>
            <inmost>0</inmost>
          </activate-radius>
        </activate-condition>
      </optional-media>
    </linkfile>

  </gpoi>

</glorie>
```

SIGNAL PROCESSING METHOD, SIGNAL PROCESSING APPARATUS, SIGNAL PROCESSING SYSTEM, AND MACHINE READABLE STORAGE MEDIUM STORING CONTROL INFORMATION OF SIGNAL PROCESSING APPARATUS

CROSS-REFERENCE TO RELATED APPLICATIONS

This application is a continuation of U.S. application Ser. No. 10/203,535, filed on Aug. 9, 2002; which is a 371 of PCT/JP01/11538, filed on Dec. 27, 2001, the disclosures of which are incorporated herein by reference.

TECHNICAL FIELD

The present invention relates to a signal processing method, a signal processing apparatus, a signal processing system, and a machine readable storage medium storing control information of a signal processing apparatus enabling easy control and use of a video cassette recorder, television tuner, or other signal processing apparatus for example video data, reception signals of a television broadcast, and other processing signals which are not usually managed in a file system.

BACKGROUND ART

Due to the advances made in reducing the small and improving the performance of information apparatuses or electronic information technology such as digitization of information, various signal processing apparatuses, specifically various AV apparatuses, data recording and/or reproducing apparatuses, communication apparatus, information processing apparatuses, etc. have become popular.

These apparatuses and apparatuses manage data and signals by various methods.

For example, computers and other information processing apparatuses, storage apparatuses using disk-like storage media as storage media, etc. often use a so-called file system for managing files by a directory structure so as to manage data organized in units of files. This file system can specify a file by designating a path or URL.

On the other hand, there is no concept of a file in for example video data recorded by a camcorder or signals of a television broadcast. These are often managed as a series of stream data by a specific signal format depending upon the content thereof.

Along with the spread of the above various types of information processing apparatuses and signal processing apparatuses, there is rising demand for linking apparatuses which have been operated independently up until now so as to use them comprehensively. Namely, demand is rising for freely exchanging data among all of the various apparatuses, centrally managing the data, or getting the various apparatuses to cooperate and link together to perform desired information processing and provision of information.

Up until now, however, no technique has been established for efficiently and simply linking the data management environments of file systems or the management environments of specific signal formats. Central management of such data was not possible. For example, under the present circumstances it is difficult to handle an apparatus connected to a control device basically managed by a file system by a control terminal or i-Link and signals handled on the apparatus in the same way as ordinary file data by software in the control device—it is barely possible to fetch data by outputting commands to an I/O device.

This becomes an obstacle when constructing a more efficient information system by linking various information and data. Improvement is desired.

DISCLOSURE OF THE INVENTION

An object of the present invention is to provide a signal processing method and a signal processing apparatus for enabling easy linkage, management, and usage in a desired form of signals which are handled in a signal processing apparatus connected by for example a control terminal or i-Link and usually not managed by the file system, for example, video data and television signals.

Another object of the present invention is to provide a signal processing system for easily linking, centrally managing, and using in a desired form the various signals handled in such a signal processing apparatus.

Still another object of the present invention is to provide a machine readable storage medium storing control information of the signal processing apparatus for enabling easy linkage, management, and usage in the desired form of such data.

In order to achieve the above objects, a signal processing method according to the present invention has the steps of setting control information describing for any signal first information for specifying a signal format of that signal and second information for specifying a desired part of that signal and controlling an apparatus for processing the signal based on the set control information to obtain the signal of the specified desired part of the signal.

Preferably, the control information further has information indicating any location linked with the desired part of the signal, and the apparatus for processing the signal is controlled to give the signal of the specified desired part when the linked location is selected.

More preferably, selection of the linked location includes a case where a location for obtaining the signal of the specified desired part becomes within a predetermined range of the linked location.

Specifically, the control information further includes third information for specifying the model of the apparatus for processing the signal.

More specifically, the control information further includes fourth information for identifying the information provided by the signal.

More specifically, the second information includes predetermined physical parameter information needed for specifying the desired part of the signal.

More specifically, the control information further includes information of the number of times of repeated output of the desired part of the signal.

Further specifically, the third information is information capable of specifying a broadcaster side of television or radio when the signal is a broadcast signal of television or radio.

Further specifically, the physical parameter information is information indicating a time code, track number, or sector number of the recorded signal when the signal is a signal recorded on any storage medium.

Further specifically, the physical parameter information is information indicating a channel or frequency of television or radio when the signal is a broadcast signal of television or radio.

Further, a signal processing apparatus according to the present invention has a control information setting means for setting a desired part of any signal by control information describing first information for specifying a signal format of the signal and second information for specifying the related desired part and a controlling means for controlling the apparatus for processing the signal based on the set control information to obtain the signal of the desired part.

Specifically, the controlling means controls the apparatus for processing the signal based on the control information to make the apparatus output the signal of the specified desired part.

More specifically, the controlling means further has an outputting means for controlling the apparatus for processing the signal based on the control information to acquire the signal of the specified desired part from the apparatus and output the acquired signal of the desired part.

Preferably, the apparatus is further provided with a location detecting means for detecting the location of the signal processing apparatus and a displaying means for displaying the detected location.

More preferably, the displaying means displays information indicating the location of the signal processing apparatus overlaid on map information of the surroundings of the location of the signal processing apparatus.

More preferably, the control information is stored on a detachable card-like storage medium, and the control information setting means reads the control information from the card-like storage medium to set the read control information.

Further, a signal processing system according to the present invention has a first signal processing apparatus for processing any signal and a second signal processing apparatus which is a signal processing apparatus for performing desired signal processing and has a control information setting means for setting a desired part of the signal processed in the first signal processing apparatus by control information describing first information for specifying the signal format of the signal and second information for specifying the related desired part and a controlling means for controlling the first signal processing apparatus based on the set control information to output the signal of substantially the specified desired part.

Specifically, the first signal processing apparatus is a data recording apparatus for any tape-like storage medium including audio tapes and video tapes.

More specifically, the first signal processing apparatus is any wave receiving apparatus including television broadcast waves and radio broadcast waves.

More specifically, the second signal processing apparatus is a navigation apparatus mounted in a mobile unit.

More specifically, the second signal processing apparatus is a computer apparatus.

Further, a machine readable storage medium storing control information of the signal processing apparatus according to the present invention stores control information describing for any signal first information for specifying the signal format of the signal and second information for specifying a desired part of the signal by a predetermined format and controlling the signal processing apparatus to obtain the signal of the specified desired part.

BRIEF DESCRIPTION OF THE DRAWINGS

FIG. 3 is a view of a concrete example of a position information file.

FIG. 6 is a view of another concrete example of the position information file.

BEST MODE FOR CARRYING OUT THE INVENTION

Preferred embodiments of the present invention will be explained next referring to the attached drawings.

An explanation will be made of an embodiment of the present invention referring to FIG. 1 to FIG. 5.

In the present embodiment, the present invention will be explained by illustrating a car mounted navigation system for displaying a map of the surroundings of a driven location on an LCD screen and guiding the driver to his destination, particularly a navigation system designed to display an image related to the position, that is, an image of a specific portion of a video tape set in a connected digital video cassette tape recorder (DVCR), when reaching the surroundings of the predetermined position set in advance.

First, an explanation will be made of the configuration of the navigation system by referring to FIG. 1.

Figure 1:
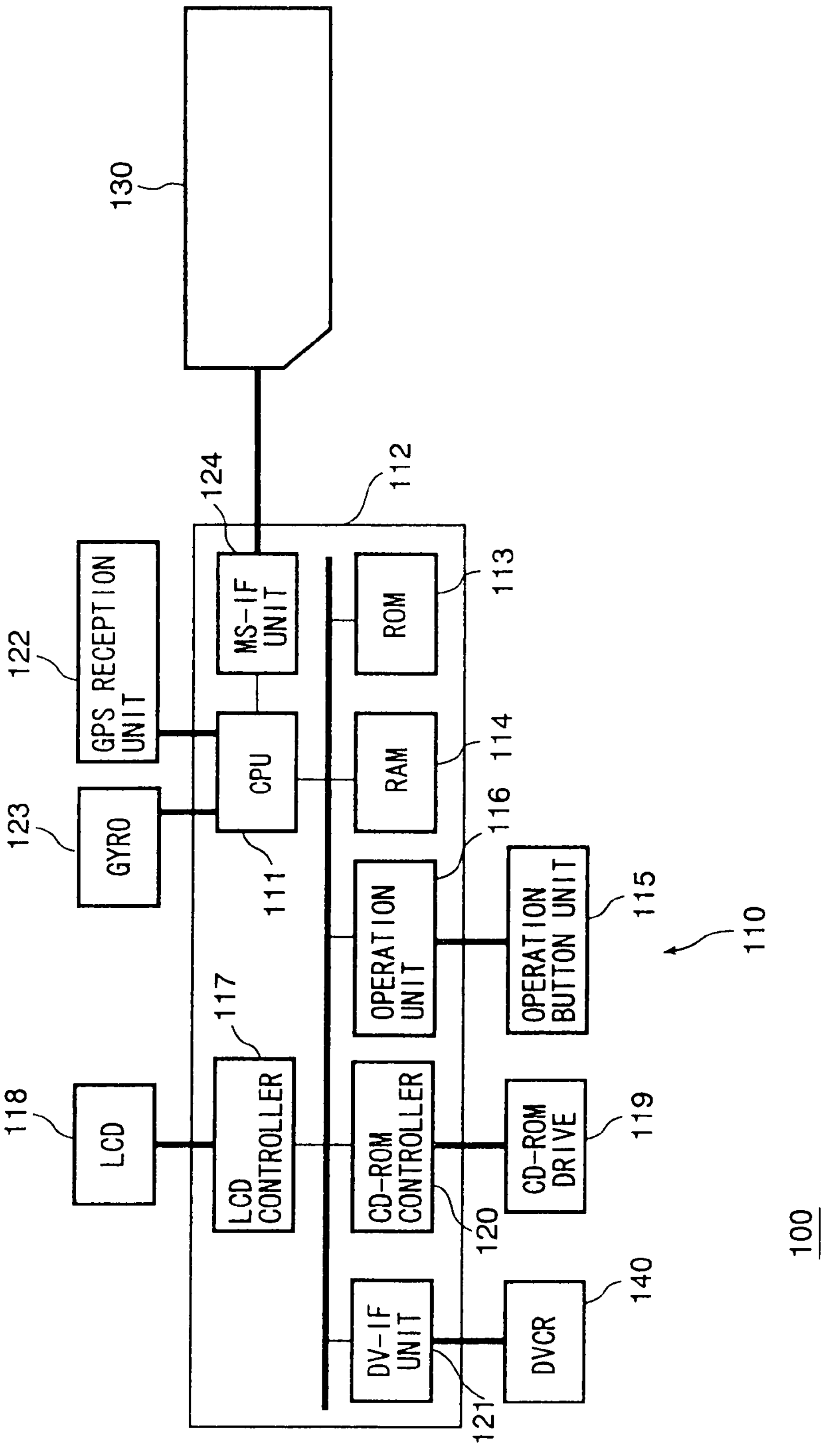
FIG. 1 is a block diagram of the configuration of a navigation system of an embodiment of the present invention.

FIG. 1 is a block diagram of the configuration of a navigation system 100.

The navigation system 100 has a navigation apparatus 110, memory stick 130, and digital video cassette tape recorder (DVCR) 140.

The navigation apparatus 110 has a CPU 111, bus 112, ROM 113, RAM 114, operation button unit 115, operation unit 116, LCD controller 117, LCD 118, CD-ROM drive 119, CD-ROM controller 120, DV-IF unit 121, GPS reception unit 122, gyro 123, and MS-IF unit 124.

Below, the configurations of the components will be explained.

The CPU 111 controls the components so that the navigation apparatus 110 performs a desired operation as a whole.

First, the CPU 111 performs processing as the navigation apparatus. Specifically, it calculates the information such as the position, advancing direction, and advancing speed of the vehicle based on GPS received information input from the GPS reception unit 122 and detected direction information input from the gyro 123. Then, it controls the CD-ROM controller 120 so as to read out suitable map information (sometimes also referred to as the position information) from the CD-ROM drive 119 based on the calculation result. Further, it controls the LCD controller 117 so that the read out map is suitably displayed on the LCD 118 in a suitable direction.

Further, the CPU 111 performs processing for providing additional information with respect to the driving position to a driver when the vehicle reaches the surroundings of a predetermined position set in advance. Specifically, the CPU 111 detects the position of the vehicle as mentioned above, has the LCD 118 display the map information on the surroundings thereof, and then searches through the position information files stored in the memory stick 130 to check if any position information file is set with respect to the interior of the area whose map was displayed on the LCD 118. When any position information file has been set, it searches for additional information linked to that position information file and displays it on the LCD 118.

At this time, as the data linked to the position information file, there is a case where the information in the navigation apparatus 110, for example, the information stored in the CD-ROM drive 119 and memory stick 130, is linked, and a case where the data of an outside apparatus such as the DVCR 140 is linked. In the case of the former linkage, the data is specified by a path designation according to the file system in the navigation apparatus 110, therefore the CPU 111 may read this and display it via the LCD controller 117 on the LCD 118.

On the other hand, the latter linkage is a link to data to the outside apparatus out of the file system which cannot be designated according to such a path designation. In the navigation apparatus 110, the case where video data stored on media on the DVCR 140 connected via the DV-IF unit 121 is referred to corresponds to this case. Note that, hereinafter, such a link to an outside apparatus will be referred to as an "optional media link".

When extracting such data, special control in accordance with the media and apparatus is necessary for each data. Also, the method of designation of the data has always been different for every type of data up to now. In the navigation apparatus 110, however, even such data is designated in a common format position information file.

For this purpose, the CPU 111 analyzes any description of that optional media link in the position information file read out from the memory stick 130, supplies control information unique to the apparatus to the corresponding device controller, and requests the linked desired data.

Then, when the data is input, by similarly controlling the device controller and by performing processing by itself, the CPU 111 displays the data on the LCD 118 via the LCD controller 117 after converting the data to a signal of a format which can be handled inside the navigation apparatus 110.

Note that the method of description of the optional media link of this position information file according to the present invention will be explained in detail later.

The bus 112 is a system bus in the navigation apparatus 110 for connecting the CPU 111 and the components.

The ROM 113 is the memory storing a processing program for the CPU 111 to execute processing such as the navigation as mentioned above or provision of desired additional information and stores parameters to be referred to in the components at that time etc.

The RAM 114 is a memory for storing data generated by the CPU 111 and the components, data in processing, etc. similarly when such processing is executed.

The operation button unit 115 is an originally provided operating means to be operated by the user of the navigation apparatus 110.

The operation unit 116 detects the operation of the operation button unit 115 by the user, generates a signal based on the operation content, and outputs the same to a predetermined component based on the operation content such as the CPU 111 or LCD controller 117.

The LCD controller 117 is a controller for displaying map information (position information) and additional information input via the bus 112 from the CPU 111, CD-ROM controller 120, DV-IF unit 121, etc. on the LCD 118.

The LCD 118 is a liquid crystal display device controlled by the LCD controller 117 and displays the input desired image data. More specifically, the image data read from a CD-ROM mounted on the CD-ROM drive 119 via the CD-ROM controller 120, image data reproduced in the DVCR 140 via the DV-IF unit 121, etc. are displayed on the LCD 118.

The CD-ROM drive 119 is loaded with a CD-ROM medium having the map information and any additional information, searches through the mounted CD-ROM medium in accordance with a request from the CD-ROM controller 120, and retrieves and outputs the map information of the desired area and additional information.

The CD-ROM controller 120 controls the CD-ROM drive 119 based on a request from the CPU 111 to acquire the map information of the desired area and additional information and outputs the same to the LCD controller 117.

The DV-IF unit 121 is an interface with the DVCR 140 connected by the i-Link and a signal processing unit. The DV-IF unit 121 controls the DVCR 140 based on a command from the CPU 111, reads out the predetermined data from the DVCR 140, and outputs the same to the LCD controller 117.

The GPS reception unit 122 receives a GPS wave, generates data for detecting the position of the vehicle based on the received signal, and outputs the same to the CPU 111.

The gyro 123 detects the advancing direction of the vehicle and outputs a signal indicating the direction to the CPU 111.

The MS-IF unit 124 is an interface controlled by the CPU 111 and communicates with the memory stick 130.

Specifically, the MS-IF unit 124 communicates with the memory stick 130 via three signal lines of a first signal line (SCLK) for transmitting a clock, a second signal line (SDIO) for transfer of data, and a third signal line (SS) for transmitting status.

The memory stick 130 is a detachable card type storage medium loaded in the navigation apparatus 110. In the navigation apparatus 110 of the present embodiment, particularly position information files for controlling the display of the additional information are stored and are accessed in accordance with the position of the vehicle.

Figure 2:
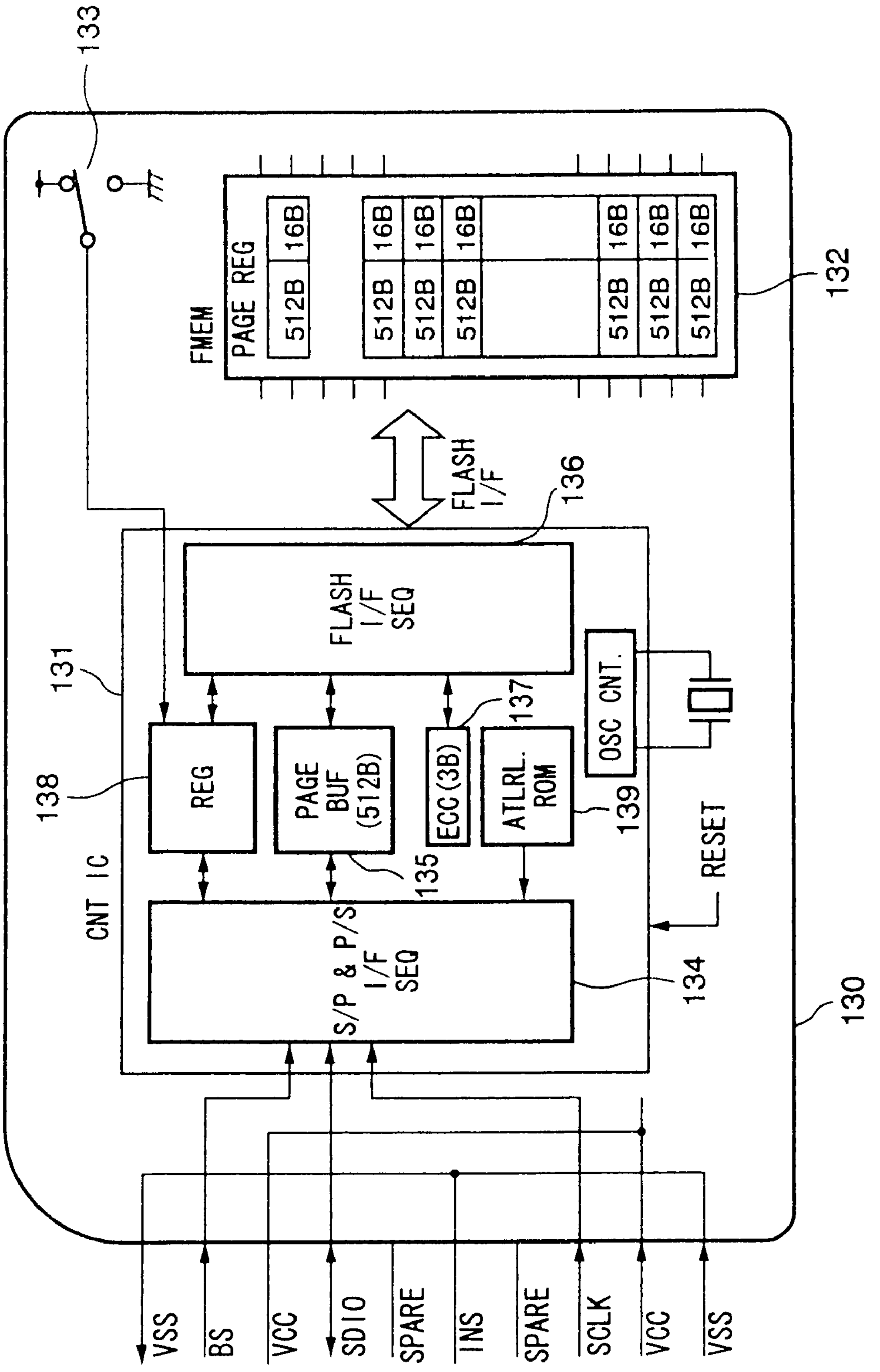
FIG. 2 is a block diagram of the detailed configuration of a memory stick of the navigation system shown in FIG. 1.

The configuration of the memory stick 130 will be explained in detail next by referring to FIG. 2.

The memory stick 130 has a control IC 131, flash memory 132, and a write protect switch 133. Further, the control IC 131 has a serial/parallel parallel/serial (S/P P/S) interface sequencer 134, page buffer 135, flash interface sequencer 136, ECC encoder/decoder 137, register 138, and attribute ROM 139.

The S/P P/S interface sequencer 134 of the control IC 131 communicates with the MS-IF unit 124 of the navigation apparatus 110, receives the clock signal SCLK and status signal SS, and transfers the data SDIO.

More specifically, it receives the data SDIO transmitted from the navigation apparatus 110 and converts the same to parallel data in synchronization with the serial clock SCLK. Then, if the converted data is a command, it outputs this to the register 138, while if the converted data is data, it outputs this to the page buffer 135.

Further, it converts the transmission data to the navigation apparatus 110 input from the page buffer 135 or the like to a serial data and transmits the same via the data line SDIO to the navigation apparatus 110.

The page buffer 135 of the control IC 131 is a memory for storing the data input from the control IC 131 in units of pages (512 bytes). The data stored in the page buffer 135 is given an error correction code by the ECC encoder/decoder 137 and then stored via the flash interface sequencer in the flash memory 132.

Further, the page buffer 135 stores the data read from the flash memory 132 via the flash interface sequencer 136. Then, after the error correction by the ECC encoder/decoder 137, the data is suitably output to the S/P P/S interface sequencer 134.

The flash interface sequencer 136 stores the page units of data stored in the page buffer 135 in the flash memory 132 in accordance with a request and reads out the page units of data stored in the flash memory 132 and stores them in the page buffer 135.

The ECC encoder/decoder 137 adds an error correction code to the data to be stored in the flash memory 132 stored in the page buffer 135. Further, it applies the error correction processing to the data read out from the flash memory 132 stored in the page buffer 135.

The register 138 generates a control command based on command data input from the S/P P/S interface sequencer 134. For example, when receiving a read status register command for viewing the operation state of the memory stick 130, the register 138 detects the settings of the erroneous erase prevention switch 133 and sets the settings thereof in the register. Then, it transmits the content of this register via the S/P P/S interface sequencer 134 to the navigation apparatus 110. The attribute ROM 139 is a memory having information such as version information of the memory stick 130 and initial settings stored therein. The information of the initial settings stored in this attribute ROM 139 is read out based on a control command generated at the register 138 the first time the memory stick 130 was loaded in the navigation apparatus 110 and is used for the settings of the units in the memory stick 130.

The flash memory 132 is a memory unit for actually storing the position information files and additional information.

The write protect switch 133 is a switch for restricting write operations of data to the flash memory 132 so that data stored in the memory stick 130 will not be erased.

The DVCR 140 is a consumer digital video cassette tape recorder of the SD type for handling NTSC signals. The DVCR 140 is connected to the navigation apparatus 110 via the DV-IF unit 121, reproduces the desired video data based on a request from the DV-IF unit 121 based on a control signal input from the CPU 111, and outputs the same to the DV-IF unit 121.

The navigation system 100 has such a configuration.

Next, an explanation will be made of the position information files stored in the memory stick 130 and utilized for the display etc. of additional information in the LCD 118 as explained above by referring to FIG. 3.

Note that, as mentioned above, as the data linked to the position information files, there are files which can be designated by path in the navigation apparatus 110 and external data linked by an optional media link. Here, an explanation will be made of a position information file in which external data is designated by an optional media link.

FIG. 3 is a view of an example of that position information file.

The first row to the third row show and set the format etc. of the description of this position information file. For example, it is set here that this position information file has a format using XML (extensible Markup Language).

The fourth row to the seventh row are "format" tags describing the used measurement system, coordinate system, person who prepared the information, information preparation date, etc.

The "gpoi" tags of the eighth row to the 17th row are descriptions for defining a specific position.

The "index" tag of the ninth row is a search tag for describing position information having a latitude and a longitude, information indicating the type of the position, information indicating whether or not the position is a mobile unit, the measurement system, etc.

Further, the position is actually defined in "poi" tags from the 11th row to the 17th row. Here, the latitude is designated by a lat tag of the 13th row, and the longitude is designated by a lon tag of the 14th row.

The "linkfile" tags from the 18th row to the 22nd row indicate the additional information and additional data linked to the position defined in the eighth to 17th rows.

Here, as mentioned above, An example wherein the corresponding data is defined by an "optional-media" link tag is shown.

The "optional-media" link is a description for defining a link destination for data in an externally connected medium and the information concerning that used in the case where the data to be linked is data of an external apparatus connected via the control terminal, i-Link, or the like.

A detailed explanation will be made of this "optional-media" link.

This "optional-media" link is described by a format as shown in (1).

<optional-media format="format"id="identification name"in="start position out="stop position" repeat="number of times of reproduction"> </optional-media> (1)

As shown in (1), in the description of the "optional-media" link, five attributes of "format", "id", "in", "out", and "repeat" can be described.

The attribute "format" is an attribute for designating the connected apparatus and the format information thereof and is an indispensable description item of the "optional-media" link. As this attribute "format", basically, any of the apparatus and format as shown in Table 1 is described. It is also possible to newly define and use a link other than this. In this case, preferably the apparatus uses a clear string of characters.

1 TABLE 1 Format Link destination media DVSDNT Consumer digital VCR, SD NTSC DVSDPAL Consumer digital VCR, SD PAL DVSDLNT Consumer digital VCR, SDL NTSC DVSDLPAL Consumer digital VCR, SDL PAL VHSNT VHS VIDEO NTSC VHSPAL VHS VIDEO PAL BETANT Beta VIDEO NTSC BETAPAL Beta VIDEO PAL 8MMNT 8 mm VIDEO NTSC 8MMPAL 8 mm VIDEO PAL VHSCNT VHS-C VIDEO NTSC VHSCPAL VHS-C VIDEO PAL DVB DVB transport stream DSS DSS transport stream DVDNT DVD VIDEO NTSC DVD-PAL DVD VIDEO PAL CD Audio CD (CDDAudio MI) VCD Picture MD MD Cassette tape PMD FM radio TAPE AM radio FM Traffic information on radio AM Television TRAFFIC TV The attribute "id" is an attribute for further specifying an object in the connected apparatus designated by the format attribute and is described according to need.

The specific description of the attribute "id" differs according to the connected apparatus.

For example, when the connected apparatus is an apparatus handling a medium such as a cassette tape, video tape, and CD, this id attribute describes the name and identification number of the medium as, for example [id="ID0000816"] and [id="Seaside Music"].

Further, when the connected apparatus is a radio or television, this id attribute describes the name of the channel as, for example [id="TV JAPAN"] and [id="JAPAN FM"].

The attribute "in" and the attribute "out" are attributes for designating the reproduction start position and ending position of the designated data and are described according to need.

The specific descriptions of the attribute "in" and the attribute "out" differ according to the connected apparatus.

For example, when the handled object is a medium such as a cassette tape, "time:minute:second" is described, for example, [in="0:15:20.00"].

Further, when the handled object is a medium such as a video tape, "time:minute:second:frame number" is described, for example [in="0:32:10.00"].

Further, when the handled object is a medium including track information such as an MD or CD, "track:minute:second:sector number" is described, for example, [in="7:2:5:00"].

Further, when the handled object is a radio, television, etc., the channel number and frequency are described by these "in" attribute and "out" attribute, for example [in="CH9"] and [in="79.00 Hz"].

The attribute "repeat" is an attribute for designating the number of times of reproduction and is described according to need. When it is not described, the number of times of reproduction is set as 1. Further, by designating [repeat="indefinite"], the reproduction is unlimitedly repeated so far as an activation condition is satisfied.

In the description of the 19th row and the 20th row of the position information file of FIG. 3, "DVSDNT" is designated as the format attribute. When referring to Table 1, it is seen that the NTSC signal of the SD system of the consumer digital VCR is connected as the handled object in this medium.

Further, as the id attribute, "Travel for Kyushu No. 2" is designated, so it is learned that the type of this video tape is "Travel for Kyushu No. 2".

Further, as the "in" attribute, "00:01:30:00", that is, a time code of 1 minute, 30 seconds, and frame number 0 is described. Then, the latitude and longitude indicated by the "pos" tag described in the 12th row to the 14th row and the data of the time code of the tape of this digital VCR are linked by this.

This concludes the explanation of a position information file.

Next, an explanation will be made of the operation of the navigation system 100 by referring to FIG. 4 and FIG. 5.

Figure 4:
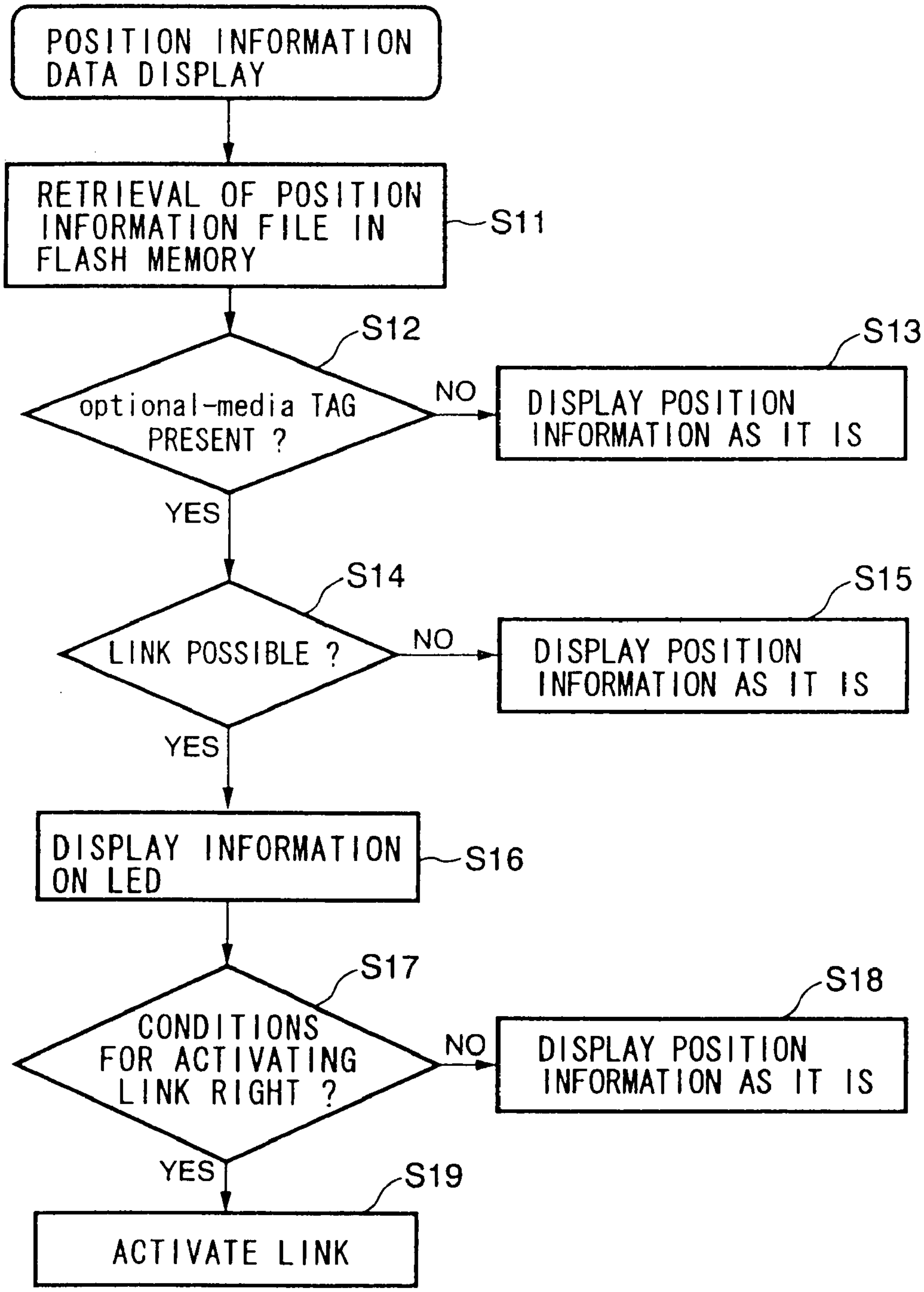
FIG. 4 is a flow chart for explaining operation of the navigation system shown in FIG. 1.
Figure 5:
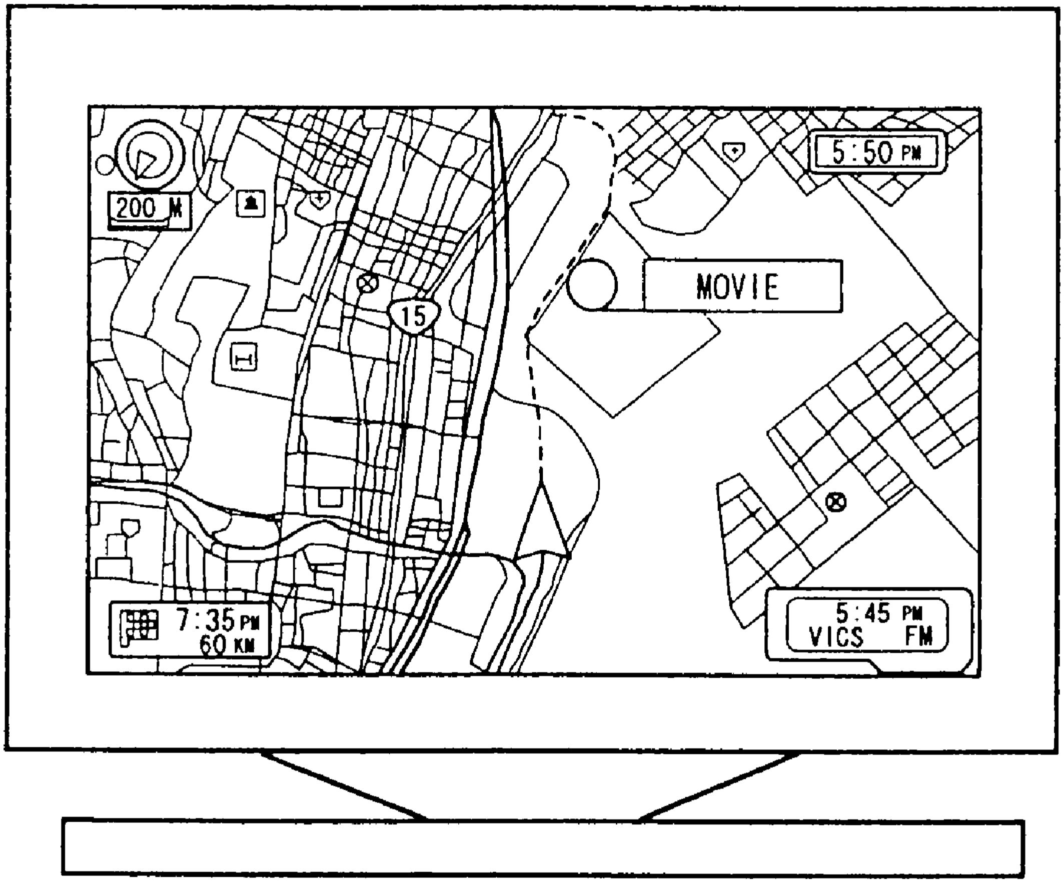
FIG. 5 is a view explaining a screen display indicating a state where external data can be linked in the navigation system shown in FIG. 1.

FIG. 4 is a flow chart for explaining the operation of the navigation system 100.

First, when the display of position information is requested by the driver via the operation button unit 115, the navigation system 100 starts the navigation operation and the processing to provide the desired information.

As the usual navigation operation, the GPS reception unit 122 receives a GPS signal, the gyro 123 detects the advancing direction etc. of the vehicle, and the CPU 111 calculates the position of the vehicle, advancing direction, advancing speed, etc. based on these received and detected signals.

Then, the CPU 111 reads out the map information (position information) from the CD-ROM drive 119 via the CD-ROM controller 120 and displays this via the LCD controller 117 on the LCD 118.

Substantially parallel to the display of such position information, the navigation system 100 searches for and displays the additional information linked to the position in the displayed map.

Namely, first, it searches for the position information file to be displayed from the flash memory 132 of the memory stick 130 (step S11).

Next, it searches for an optional-media tag from the interior of the file (step S12). When there is no optional-media tag, it displays the position information on the LCD 118 as it is (step S13).

When there is an optional-media tag, it analyzes the described format attribute and decides whether or not linkage to the described external data is possible (step S14).

When it is impossible to realize the link, it displays the position information on the LCD 118 as it is (step S15). For example, when there is the description of format="VHSNT", but a VHS video of the NTSC is not connected etc., it is impossible to realize the link, so the position information will be displayed on the LCD 118 as it is.

When it is decided that the link with the designated external data is possible, the fact that the link is possible is displayed to the user at the LCD 118 (step S16). Specifically, "MOVIE" etc. is displayed as shown in for example FIG. 5 at the linked position and it is informed to the user that some sort of additional information linked to that location exists.

Then, when the user selects this "MOVIE", it is regarded that the condition for activating the link is satisfied (step S17) and the link is started based on the information of the optional-media tag (step S19).

In the position information file shown in FIG. 3, id="Travel for Kyushu No. 2" is described. Therefore the name of the cassette inserted in the DVCR 140 is confirmed. If it is different, the insertion of a correct tape is requested to the user. Then, when the correct tape is inserted, according to the description of in="00:01:30:00", reproduction is started from the position of that time code.

This reproduced image can be viewed via the DVCR 140, but can also be displayed on the LCD 118 via the DV-IF unit 121 and the LCD controller 117.

Note that when the user did not select "MOVIE" at step S17, the position information is displayed as it is regarding that the condition for activating the link is not satisfied (step S18).

The navigation system 100 sequentially repeats such processing of the navigation and the link information display.

This concludes the explanation of the operation of the navigation system 100.

In this way, in the navigation system 100 of the present embodiment, by describing the position information file of the format and content as shown in FIG. 3, the DVCR 140, more generally the apparatus connected by the control terminal or i-Link terminal, can be easily linked.

As a result, in the navigation system 100, it becomes possible to centrally manage the data of a variety of formats and easily utilize this.

Further, in the navigation system 100, when starting the link, it becomes possible to confirm whether or not data is really data which can be linked or whether or not a linkage state has been exhibited by referring to the content etc. of the "format" tag. This consequently means that various states of various apparatuses and data can be suitably coped with and further promotes central management and utilization of the data by such a method.

Further, at the part of the description of the "optional-media" link in the format of the position information file mentioned above, the id attribute of the case where the connected apparatus is a radio, television, etc. describes the name of the broadcast station such as [id="TV JAPAN"] or [id="JAPAN MI"]. Here, the TV channel and frequency are not described. As a result, even if the allocation and frequency of a TV channel change due to the change of the used position, it is not necessary to change the description of the position information file, so this is preferred.

Note that the present invention is not limited to the present embodiment. Any of various suitable modifications are possible.

For example, in the above embodiment, when executing the link with the external data, an inquiry is made to the user for confirmation, but the invention is not limited to such an operation.

For example, when the position of the vehicle is near the corresponding position, the link can be unconditionally executed without confirmation of the user. The details of such a routine corresponding to the processing of step S17 of the flow chart shown in FIG. 4 can be freely changed by changing the setting of the CPU 111 analyzing the position information file or the decode portion of each device controller even for the same position information file. Any setting is possible in this way.

However, on the other hand, it is also possible to clearly set processing for automatically executing a link without inquiry to the user without depending upon processing of the CPU 111 or device controller.

An example of such a setting of the position information file is shown in FIG. 6.

The "activate-condition" tags shown in the 21st to the 26th rows of FIG. 6 are tags for automatically executing the link.

Namely, an outer circumference of the range which a function reaches is defined by the "outmost" tag of the 23rd row, while an inner circumference of the range which the function reaches is defined by the "inmost" tag of the 24th row. The center is the position designated by the "pos" tag.

Accordingly, the position information file shown in FIG. 6 becomes a description where the activation condition becomes true in all of an area within a radius of 500 meters from a position of north latitude 35.6778 degrees and east longitude 139.7686 degrees indicated by the "pos" tag. The link is executed within this range.

Note that, this condition becomes the condition examined at step S17 of the flow chart shown in FIG. 4.

As a result, when the vehicle reaches this set area, the video is automatically reproduced. When the vehicle goes out of the area, the display is automatically terminated.

In this way, by using the "activate-condition" tag, the link can be automatically activated too.

Further, in the above embodiment, the DVCR 140 was shown as the external information apparatus, and it was shown that data provided by this could be suitably referred to by the position information file. However, the external information apparatus is not limited to this. It is also possible to handle any apparatus.

Figure 7:
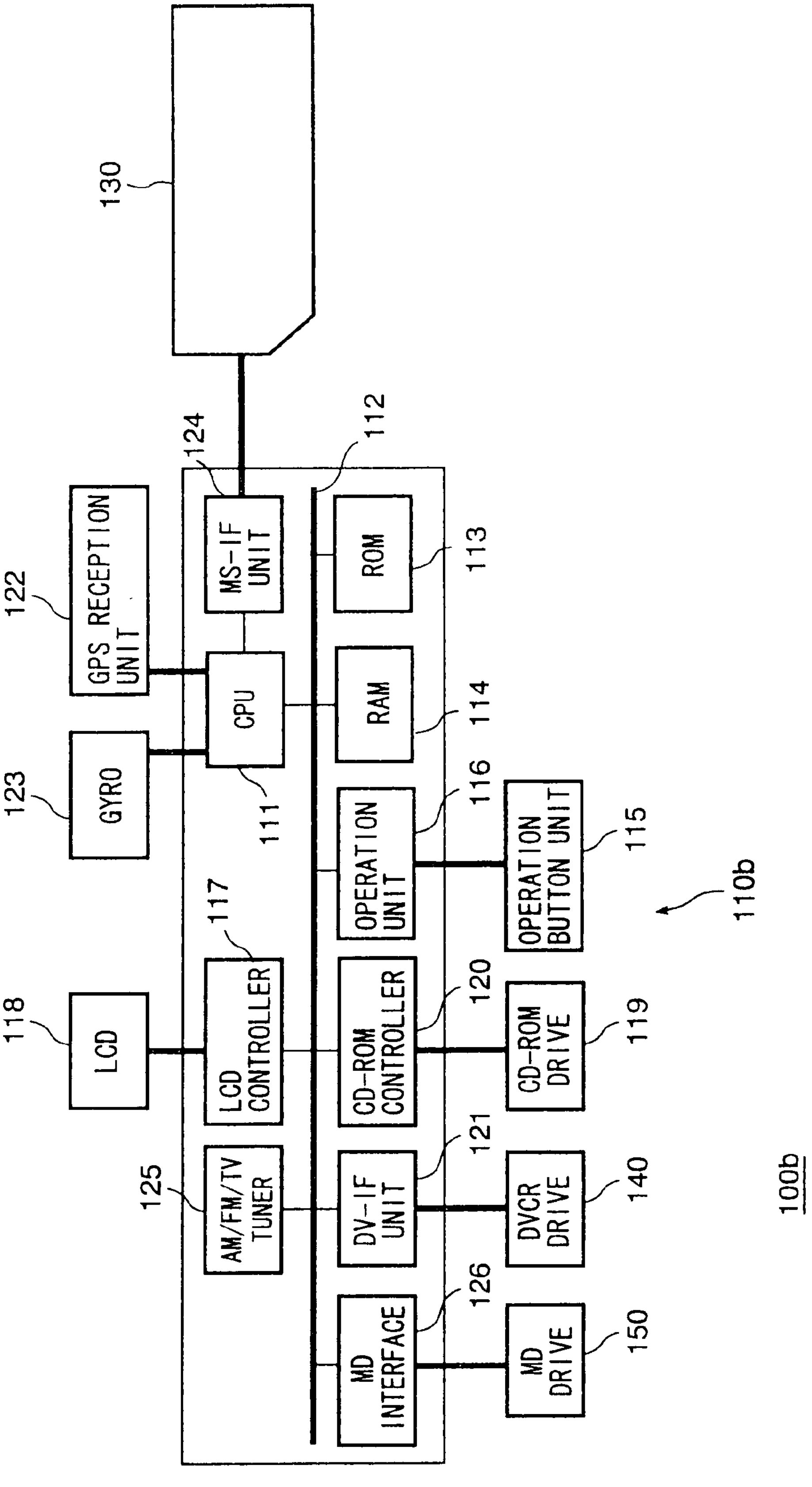
FIG. 7 is a view of a modification of the navigation system shown in FIG. 1.

For example, a navigation system 100*b* shown in FIG. 7 is configured with an AM/FM/TV tuner 125, MD interface 126, and an MD drive 150 further added to the navigation system 100.

The navigation system 100*b* having such a configuration can be linked to a larger number of apparatuses or signals of a DVCR, CD, audio MD, FM radio, AM radio, television broadcast, and so on.

Further, it becomes possible to prepare position information data, for example, which automatically turns on the switch of the AM radio and tunes in a channel when the vehicle enters an area where information is broadcast or plays specific music when the vehicle approaches a certain location.

Further, particularly in the part of the description of the "optional-media" link in the format of the position information file mentioned above, the id attribute of the case where the connected apparatus is a radio, television, etc. described the name of the channel, for example [id="TV JAPAN"] and [id="JAPAN FM"]. However, it is also possible to describe the channel number, frequency, etc. here.

Note, in that case, when the allocation and the frequency of the TV channel change due to a change of the used position, it is necessary to also change the description of the position information file.

Further, in all of the above embodiments, a vehicle mounted navigation system was exemplified, but the present invention is not limited to this. For example, it is also possible to apply the present invention to the control of video data from a personal computer or the like or broadcast waves.

Further, in the above embodiments, position information files were stored in the memory stick 130, but the memory stick 130 is not necessary. It is also possible to store the position information files in any portable storage medium or a not illustrated memory unit in the navigation system 100.

Further, in the above embodiments, the image obtained from the DVCR 140 was displayed on the LCD 118. However, the gist of the present invention resides in that the DVCR 140 is controlled by the navigation apparatus 110 to output the desired data. The destination thereof is not limited to the navigation apparatus 110. Namely, so far as the DVCR 140 is an apparatus having a display unit in the first place, it is also possible to display a selected image on the display unit of the DVCR 140. This corresponds to the case where the AM/FM/TV tuner 125 is controlled by the control from the navigation apparatus 100*b* in the navigation system 100*b* shown in FIG. 7 and audio is output from the AM/FM/TV tuner 125. Such a mode is also within the scope of the present invention.

Further, in the above embodiments, a position information file was analyzed in the CPU 111 and converted to commands adapted to each device controller which were then supplied to each device controller. However, it is also possible if the CPU 111 merely analyzes only the required portion of the "optional-media" link of the position information file, appropriately transmits the description to the device controllers, analyzes the required portion of the "optional-media" link at each device controller side, converts this to a code adapted for controlling the signal processing apparatus controlled by itself, and performs the control.

In this way, according to the present invention, it is possible to provide a control method of a signal processing apparatus and a signal processing apparatus making it possible to easily link, manage, and use in a desired mode video data and television signals and other signals handled in a signal processing apparatus connected by for example a control terminal or i-Link and usually not managed by the file system.

Further, a signal processing apparatus for easily linking, centrally managing, and using in a desired mode various signals handled in such a signal processing apparatus can be provided.

Further, a machine readable storage medium storing control information of a signal processing apparatus for easily linking, centrally managing, and utilizing data in a desired mode can be provided.

Industrial Applicability

The present invention can be widely used for technology enabling easy control and use of various signal processing apparatuses for processing signals which are not usually managed in a file system.

The invention claimed is:

1. A signal processing apparatus comprising:

position information receiving means for receiving input position information;

memory means for storing first linkage data and second linkage data which are related to position information, said first linkage data specifying internal data and said second linkage data specifying external data;

reading means for reading said first linkage data and said second linkage data from said memory means;

display means for displaying data;

control means for controlling said reading means to retrieve and display, on the display means, the data specified by said first linkage data and said second linkage data;

deciding means for deciding whether linkage to the external data specified by said second linkage data is possible; and informing means for informing that said linkage is possible when said deciding means decides the linkage is possible.

2. The signal processing apparatus according to claim 1, wherein said first linkage data and said second linkage data are contained in a common file with respect to each position information.

3. The signal processing apparatus according to claim 1, further comprising:

detecting means for detecting an instruction to retrieve the data specified by said second linkage data;

said control means being operative to control said reading means to retrieve and display the data specified by said second linkage data according to the instruction detected by said detecting means.

4. The signal processing apparatus according to claim 1, wherein said first linkage data designates a path according to a file system which is used in the apparatus.

5. The signal processing apparatus according to claim 1, further comprising:

position detecting means for detecting position information for input to the position information receiving means.

6. The signal processing apparatus according to claim 1, further comprising:

map storing means for storing map information related to position information;

wherein said control means is operative to retrieve and display said map information corresponding to said position information received by said position information receiving means and to display information which indicates that said linkage is possible on a related position in the displayed map information.

7. A signal processing method comprising the steps of:

receiving input position information;

storing, in memory means, first linkage data and second linkage data which are related to position information, said first linkage data specifying internal data and said second linkage data specifying external data;

reading said first linkage data and said second linkage data from said memory means;

retrieving and displaying the data specified by said first linkage data and said second linkage data;

deciding whether linkage to the external data specified by said second linkage data is possible; and informing that said linkage is possible when said deciding step decides the linkage is possible.

8. The signal processing method according to claim 7, wherein said first linkage data and said second linkage data are contained in a common file with respect to each position information.

9. The signal processing method according to claim 7, further comprising the steps of:

detecting an instruction to retrieve the data specified by said second linkage data; and retrieving and displaying the data specified by said second linkage data according to the detected instruction.

10. The signal processing method according to claim 7, wherein said first linkage data designates a path according to a file system which is used in an apparatus for performing the method.

11. The signal processing method according to claim 7, wherein the received position information is position information detected by a position detecting means.

12. The signal processing method according to claim 7, further comprising the steps of:

storing map information related to position information;

retrieving and displaying said map information corresponding to the received position information and displaying information which indicates that said linkage is possible on a related position in the displayed map information.

* * * * *